(12) United States Patent
Warren

(10) Patent No.: US 11,913,587 B2
(45) Date of Patent: Feb. 27, 2024

(54) METHOD AND SYSTEM FOR COATING A PIPE

(71) Applicant: Warren Environmental & Coating, LLC, Middleborough, MA (US)

(72) Inventor: Danny Warren, Carver, MA (US)

(73) Assignee: Warren Environmental & Coatings, LLC, Gainesville, GA (US)

( * ) Notice: Subject to any disclaimer, the term of this patent is extended or adjusted under 35 U.S.C. 154(b) by 0 days.

(21) Appl. No.: 16/801,659

(22) Filed: Feb. 26, 2020

(65) Prior Publication Data

US 2020/0191314 A1 Jun. 18, 2020

Related U.S. Application Data

(63) Continuation of application No. 15/983,601, filed on May 18, 2018, now Pat. No. 10,584,822, and a continuation of application No. 15/267,711, filed on Sep. 16, 2016, now Pat. No. 9,982,827, and a
(Continued)

(51) Int. Cl.
| | |
|---|---|
| *F16L 55/16* | (2006.01) |
| *F16L 55/1645* | (2006.01) |
| *B05B 13/06* | (2006.01) |
| *G01M 5/00* | (2006.01) |
| *F16L 55/18* | (2006.01) |

(Continued)

(52) U.S. Cl.
CPC ...... *F16L 55/1645* (2013.01); *B05B 13/0636* (2013.01); *F16L 55/18* (2013.01); *G01M 5/0025* (2013.01); *G01M 5/0033* (2013.01); *G01M 5/0066* (2013.01); *G01M 5/0075* (2013.01); *F16L 2101/16* (2013.01); *F16L 2101/30* (2013.01)

(58) Field of Classification Search
CPC ... F16L 55/1645; F16L 55/18; F16L 2101/16; F16L 2101/30; F16L 55/26; F16L 55/30; B05B 13/0636; B05D 7/222; B05D 2254/04; G01M 5/0025; G01M 5/0033; G01M 5/0066; G01M 5/0075; G01M 3/005; G01N 21/954
See application file for complete search history.

(56) References Cited

U.S. PATENT DOCUMENTS

| | | |
|---|---|---|
| 4,092,950 A | 6/1978 | Hart |
| 4,107,738 A | 8/1978 | Van Norman |
| 4,714,095 A | 12/1987 | Muller et al. |

(Continued)

FOREIGN PATENT DOCUMENTS

| | | |
|---|---|---|
| WO | 2013095143 A1 | 6/2013 |

*Primary Examiner* — Carib A Oquendo
(74) *Attorney, Agent, or Firm* — Hinckley, Allen & Snyder, LLP; David R. Josephs

(57) ABSTRACT

A method and system for evaluating the interior surface and exterior wall conditions of a pipeline while also dynamically installing a repair coating in a pipeline, such as an underground water pipeline. The system is towed into the pipeline and drawn back therethrough. As the system is drawn back, one module in the system evaluates the surface condition of the interior of the pipe and another module evaluates the structural condition of the wall of the pipe. Based on the evaluation data obtained from the two modules an epoxy material is applied to the interior surface of the pipe using a spin cast machine that is drawn behind the two modules. Preferably, a layer of epoxy is applied to the interior surface of the host pipe to the appropriate thickness based on the pipe condition as determined by the two modules.

14 Claims, 2 Drawing Sheets

Related U.S. Application Data continuation-in-part of application No. 14/067,285, filed on Oct. 30, 2013, now Pat. No. 9,476,535.

(51) Int. Cl.
 *F16L 101/30* (2006.01)
 *F16L 101/16* (2006.01)

(56) References Cited

U.S. PATENT DOCUMENTS

| | | |
|---|---|---|
| 4,770,562 A | 9/1988 | Muller et al. |
| 4,995,761 A | 2/1991 | Barton |
| 5,181,668 A | 1/1993 | Tsuji et al. |
| 5,653,555 A | 8/1997 | Catallo |
| 5,680,885 A | 10/1997 | Catallo |
| 5,706,861 A | 1/1998 | Wood et al. |
| 6,632,475 B1 | 10/2003 | Bleggi |
| 6,820,653 B1 | 11/2004 | Schempf et al. |
| 7,112,350 B1 | 9/2006 | Roberts |
| 7,181,985 B2 | 2/2007 | MacMillan et al. |
| 2003/0039752 A1 | 2/2003 | Winiewicz et al. |
| 2003/0161946 A1 | 8/2003 | Moore et al. |
| 2009/0225159 A1 | 9/2009 | Schneider et al. |
| 2011/0297243 A1 | 12/2011 | Kiest, Jr. |
| 2012/0098955 A1 | 4/2012 | Krywyj |
| 2012/0257042 A1 | 10/2012 | McKaigue et al. |
| 2013/0280424 A1 | 10/2013 | Jedneak |
| 2014/0349010 A1 | 11/2014 | Bastiaans |

METHOD AND SYSTEM FOR COATING A PIPE

CROSS-REFERENCE TO RELATED APPLICATIONS

This application is a continuation of U.S. patent application Ser. No. 15/983,601, filed May 18, 2018; is a continuation of U.S. patent application Ser. No. 15/267,711, filed Sep. 19, 2016; which is a continuation in part of earlier filed U.S. patent application Ser. No. 14/067,285, filed Oct. 30, 2013.

BACKGROUND OF THE INVENTION

The present invention relates generally to a method and system for evaluating and repairing a distressed pipeline by installing a coating on the inside of the pipeline. More specifically, the present invention relates to system and method wherein a device is drawn along a pipeline to simultaneously assess the interior surface of the pipeline, assess the structural condition of the pipeline wall and apply a curable resin system to coat the interior of the pipeline.

Throughout developed parts of the world, there are numerous pipeline conduits that run underground in order to provide utility services to businesses and residences. These utilities include water lines, sewer pipes, storm water drains, and the like. Since these pipelines are installed underground, they are constantly subjected to numerous environmental pressured that cause the pipeline to deteriorate. For example, the pipeline may deteriorate due to ordinary aging, corrosive action of the fluids being transported in the line, environmental conditions such as groundwater exposure, or other reasons. Over time, all of the wear factors that impact on the pipeline result in holes, cracks, structural breakdown and other defects in the line that must be repaired in order to prevent fluid leakage and pipeline collapse problems.

In some instances, the concern is that foreign matter, which is initially part of the actual construction of the pipeline, may begin to flake off of the interior surfaces of the damaged pipeline and enter the fluid flow within the pipeline. For example, ductile iron piping has a clay liner surface that upon failure may allow rust to enter the fluid flow. Similarly, transite pipes that contain asbestos reinforcing fibers may release asbestos into the drinking water contained therein as the wall of the pipe begins to deteriorate. Finally, the potential exists for the introduction of substances that flow from the surrounding underground environment into the pipeline or for the water that is being carried through the pipeline conduit to flow outwardly through the cracks leading to a loss of water pressure and other problems.

Further, the wall materials of the pipeline itself may breakdown and deteriorate from the outside in. As the materials breakdown, corrode or otherwise wear the strength of the wall itself is compromised. Should the walls deteriorate significantly, the pipeline is at risk of failure.

The traditional approach to repairing the above-identified issues entailed digging up the effected pipeline and replacing it. Given the millions of miles of installed pipeline in the United States alone, this solution would be prohibitively expensive. Further, such pipelines are typically located beneath streets and right of ways where digging would create traffic flow problems and require extensive repaving of roadways as the replacement process was completed. In the case where transite pipelines must be repaired, an additional issue regarding the need to dispose of large quantities of asbestos waste must be addressed.

In an attempt to overcome many of these problems related to the traditional digging methods, a number of methods for renovating existing underground pipelines have been developed. Many of these methods employ the installation of a lining on the interior of the damaged pipeline using a lining hose and a calibration hose. For example, U.S. Pat. No. 4,714,095 (Müller) discloses a method of salvaging an underground sewer pipe with a lining hose and calibrating hose. The lining hose includes an inner layer, which is treated with a first resin, and an outer layer, which is not treated with a resin. The lining hose is placed into the pipe conduit. A surface region of a calibrating hose, which will contact the inner layer of the lining hose, is coated with a second resin. Then, the calibrating hose is introduced into the lining hose. The resins harden so that the lining hose becomes attached to contact surfaces of the calibration hose.

U.S. Pat. No. 4,770,562 (Müller) discloses another method of salvaging an underground pipe conduit. A lining hose having an inner layer that is saturated with a resin is used. The lining hose includes an outer layer, which is perforated to form flow-through openings for the resin of the inner layer. The lining hose is introduced into the pipe conduit. Then, the lining hose is shaped to conform to the pipe by introducing an auxiliary hose into the lining hose and injecting fluid into the auxiliary hose. The resins harden to form a lining structure in the pipeline. After the curing step, the auxiliary hose can be kept in the lining hose or it can be removed using ropes or cables.

U.S. Pat. No. 5,653,555 (Catallo) discloses a method of lining a pipe conduit using multiple curing resins. A lining hose, which is coated with a high-strength resin, is first positioned inside of the conduit. The lining hose is then expanded into contact with the inside surface of the conduit by inverting a calibration hose. The calibration hose has a layer of corrosion-resistant resin. The high-strength and corrosion-resistant resin layers are cured by the application of a heated fluid. The cured lining hose and calibration hose form a rigid self-supporting structure. The calibration hose is not removed from the liner.

U.S. Pat. No. 5,680,885 (Catallo) discloses a method of rehabilitating a damaged pipe conduit using a lining hose and calibration hose. The inner layer of the lining hose is soaked with an excess volume of resin. The calibration hose contains a resin-absorbent layer. The calibration hose is placed in the lining hose and inverted by the application of heated water. After inversion, the resin-absorbent layer of the calibration hose contacts and adheres to the resin-coated layer of the lining hose. Upon curing, the calibration hose becomes an integral part of the liner.

U.S. Pat. No. 5,706,861 (Wood) discloses a method of lining a section of a pipeline by a "cured in place" system using a lining tube and inflatable bladder. The lining tube is impregnated with a curable synthetic resin and carried into the pipe conduit on an annular inflatable bladder. The bladder is inflated and the lining tube is cured to the pipeline. Then, the bladder is peeled away from the cured lining tube and removed from the pipe conduit by ropes.

Although the above-described conventional methods may be somewhat effective in repairing pipelines, they still suffer from various problems. For example, problems arise concerning the inversion of a felt liner because it is relatively delicate and tends to break or rip during the inversion process. Also, pulling prior art liner tubes around corners is very difficult resulting in fractures in the sealing at such joints. Also, the pipeline joints found at corners and periodically along the length of the pipeline forms voids that cannot be completely filled by the prior art methods. Thus, the prior art methods can do nothing to improve the strength of the pipeline at its joints. Another difficulty is that once a liner has been installed, the identification of lateral supply pipe branches are difficult to identify and clear.

Further, none of the methods above provide for a real-time analysis of the condition of the pipeline. While these systems place a liner in the pile, they do not make a determination relating to the interior surface condition or structural wall condition of the pipeline. As a result the lining process simply takes a one size fits all approach that may not actually address the issues with the pipeline. Further, the approach may result in too much or too little material being added to the pipeline relative to the pipeline condition.

In view of the foregoing, there is a need for a method and system for rehabilitating a pipe that both evaluates the condition of the interior surface of the pipeline as well as the condition of the pipeline wall while further applying an interior coating for repair of the pipeline. There is also a need for a method and system that can be drawn along the interior of a pipeline that interactively controls the thickness of an applied coating based on a real-time evaluation of the condition of the interior surface of the pipeline as well as the condition of the pipeline wall

BRIEF SUMMARY OF THE INVENTION

In this regard, the present invention provides a method and system for evaluating the interior surface and exterior wall conditions of a pipeline while also dynamically installing a repair coating in a pipeline, such as an underground water pipeline. Installing such a coating enables a damaged pipeline to be repaired and salvaged and placed in a condition for normal use. Further, the evaluation process allows a determination to be made as to whether the pipeline requires the installation of further reinforcing material such as a liner. In accordance with the method of the present invention, the interior surface of the pipeline to be repaired and salvaged is first prepared by removing excess debris and dirt. The preparation is preferably performed with the appropriate surface preparation material based on the pipe material and condition.

The system of the present invention is towed into the pipeline and drawn back therethrough. As the system is drawn back, one module in the system evaluates the surface condition of the interior of the pipe and another module evaluates the structural condition of the wall of the pipe. Based on the evaluation data obtained from the two modules an epoxy material is applied to the interior surface of the pipe using a spin cast machine that is drawn behind the two modules. Preferably, a layer of epoxy is applied to the interior surface of the host pipe to the appropriate thickness using a machine such as a spincast machine that coats the walls of the pipe as it travels there along.

This invention operates in a smart manner to reduce the time required to evaluate and repair a pipeline. Further the system applies only the amount of material needed to repair the existing condition of the pipe in real time.

Therefore, it is an object of the present invention to provide a new and novel system and process for lining the interior surface of a pipeline to repair and salvage the pipe so that is can be used normally in a leak-free condition. It is another object of the invention to provide a structural lining process that effectively seals all cracks and faults in an existing pipeline. A further object of the invention is to provide a lining process that evaluates the condition of the pipe and used that data to apply the required coating thickness to effect a repair that is relatively inexpensive to carry out compared to prior art processes without sacrificing the integrity of the sealing and repair accomplished by the process of the present invention.

These together with other objects of the invention, along with various features of novelty that characterize the invention, are pointed out with particularity in the disclosure and drawing annexed hereto and forming a part of this disclosure. For a better understanding of the invention, its operating advantages and the specific objects attained by its uses, reference should be had to the accompanying drawings and descriptive matter in which there is illustrated a preferred embodiment of the invention.

BRIEF DESCRIPTION OF THE DRAWINGS

In the drawings which illustrate the best mode presently contemplated for carrying out the present invention.

DETAILED DESCRIPTION OF THE INVENTION

Figure 1:
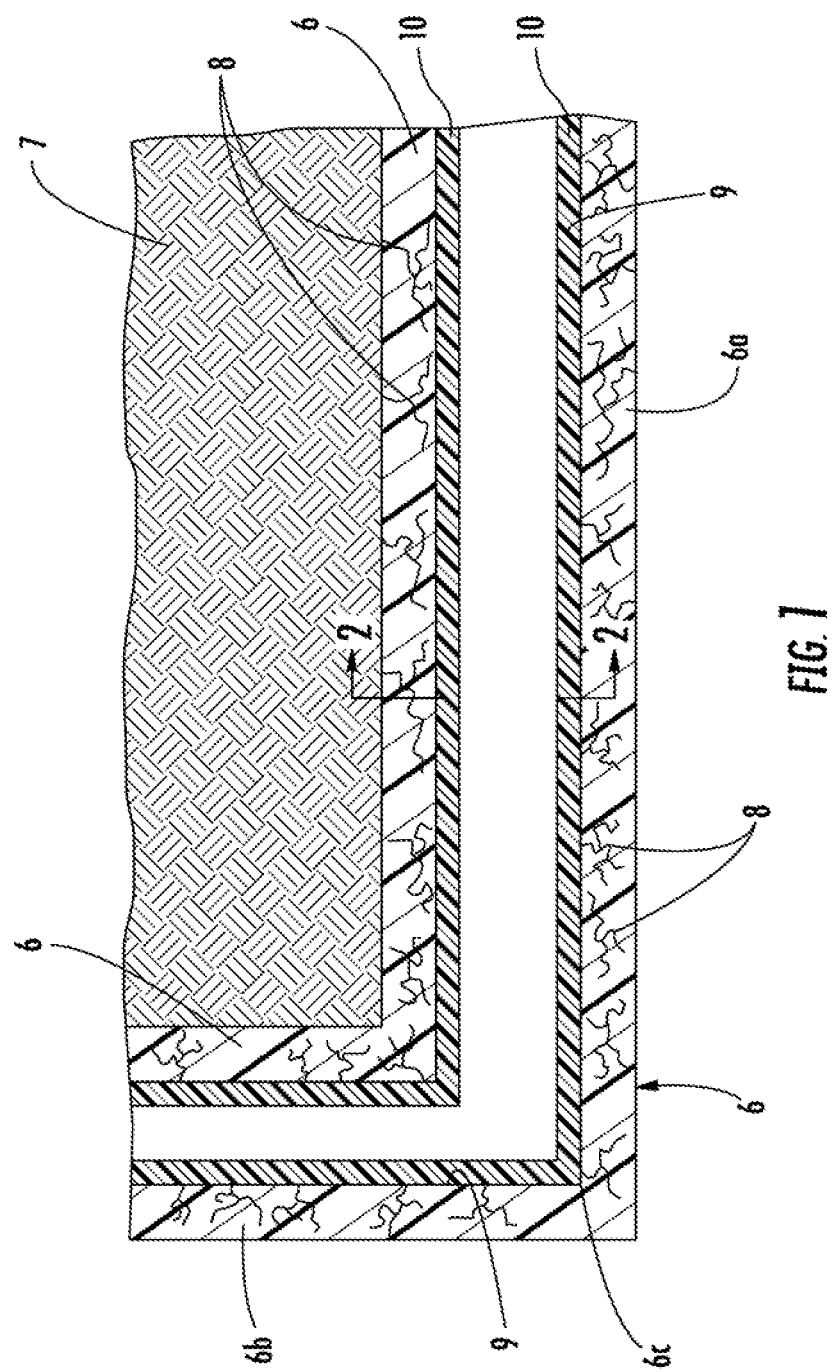
FIG. 1 is a cross-sectional view of a damaged piping system.

Now referring to the drawings, the method and system for repairing a pipeline in accordance with the teachings of the present invention is shown and generally illustrated in the figures. In summary, the system of the present invention is used to simultaneously inspect and repair a damaged underground pipeline, such as a water line, so that it can used in the normal course without undesirable leaks. As can be understood, cracks and leaks in a fluid line are undesirable to the associated pressure drops and flow inefficiencies. Further, in a cracked pipeline, particles commonly break off from the inner surface of the pipeline thereby contaminating the fluid that flows through the pipeline.

Referring first to FIG. 1, a side cross-section view of a typical pipeline installation is shown. The pipeline or host pipe 6 is installed in the ground 7 where a number of cracks 8 exist representing undesirable leaks. The pipeline 6 includes a horizontal section 6a and a vertical section 6b. A common pipeline 6, as shown in FIG. 1, is typically made of concrete, coated ductile iron, clay tile or transite. Foreign matter, such as dirt, accumulates on the inner wall surfaces 9 over time. The debris (not shown) forms hard scale deposits on the wall surfaces, and these scales are difficult to remove. Similarly, if the pipeline 6 is constructed of ductile iron, as the interior coating fails, rust deposits will build up on the interior surfaces 9 of the host pipe 6. Also, degradation of the pipeline 6 over time causes bits of the pipeline 6 structure itself to break off, a process that is further exacerbated as cracks appear therein.

In addition to a breakdown of the inner surface of the pipeline, the walls of the pipeline themselves begin to deteriorate. The cracks and external breakdown of the pipe wall cause further deterioration of the pipeline integrity.

Typically in a repair process the inside surface 9 of the pipeline 6, to be repaired, is preferably first prepared to remove the aforementioned debris and dirt to ensure a good bond, as will be described in detail below. Preferably, the inner wall surfaces 9 of pipeline 6 are cleaned by injecting highly pressurized water into the pipeline. The pressurized water stream strikes the inside walls forcefully and scrubs the walls. For example, the water is provided at up 30,000 psi to ensure a clean surface. Even higher pressure can be used, if necessary. Known water spraying devices are used for this step of the process. The injected water substantially removes the foreign debris to leave a clean inner wall surface 9 remaining. While high-pressure water is preferably used, air or steam may be used instead. Also, additional cleaning agents are not preferably used but such cleaning agents could be added to the water, air or steam to assist in cleaning depending the application and environment. After surface cleaning is complete, any standing water left remaining, such as that on the bottom of the pipeline 6, must be removed. High-pressure air, using known air blowing equipment, is injected into the pipeline to clear it of any remaining water and cleaning media.

Figure 2:
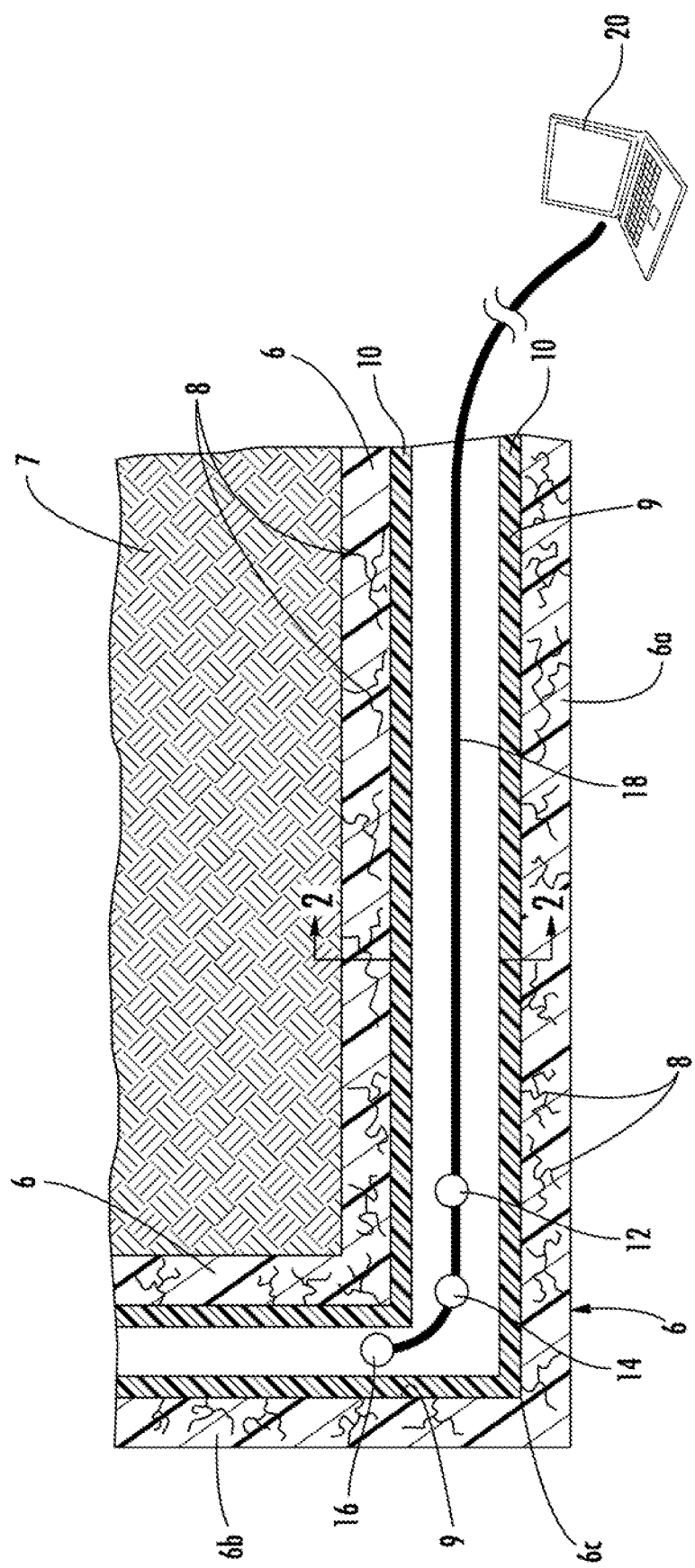
FIG. 2 is a cross-sectional view of the piping system taken along line 2-2 of FIG. 1 depicting the system of the current invention.

With the inner surface 9 of the pipeline 6 cleaned and prepared, the apparatus of the present invention is introduced into the pipeline as depicted at FIG. 2. The apparatus is a towable inspection and coating system that is arranged to have at least three spheres on spaced apart linked relation. One of the spheres 12 includes scanning equipment therein to read and map the condition of the interior surface of the pipeline. Such scanning equipment may include but is not limited to cameras and/or laser scanners. Another one of the spheres 14 includes scanning equipment for detecting the structural condition of the pipe wall and the thickness of the pipe wall. Preferably such equipment includes a sonar device. Another one of the spheres 16 is formed to house a coating device, such as a spinning spray head system, to apply a coating to the interior surface of the pipeline.

It should be noted that the coating device is preferably housed in the last sphere 16 of the inspection and coating system so that none of the coating and inspection system is drawn through the freshly applied coating materials. The relative positioning of the other spheres 12 and 14 is not critical as the interior surface scanning and the exterior pipe wall scanning can be performed in any order making the relative ordering of those spheres 12 and 14 not critical to the present invention.

An umbilical feed line 18 connects all of the spheres and serves both as a tow line for the coating and inspection system as well as an electronic communication line with a control computer 20 and a feed line for supplying a coating material to be applied via the coating device. In operation the first and second spheres 12, 14 scan the condition of the pipeline and feed the data to the computer 20 via the umbilical line 20. The computer 20 using the data determines the thickness of the required coating to be applied in order to fill cracks or voids in the pipeline. Once the computer 20 determines the coating thickness it regulates the flow rate and/or speed of the coating device in order to increase or decrease the coating flow in order to properly replace the lost structural value of the pipeline.

The arrangement of the spaced apart spheres connected by a flexible umbilical allows for the system to be drawn through pipelines that include bends rather than requiring repairs to be made in straight runs only. This arrangement introduces flexibility that allows the device to be drawn around tight bends in pipelines without getting caught or snagged at the corners.

The coating device applies a quick setting resin 10 that is sprayed onto the surfaces of the inside wall surfaces 9 in accordance with this invention. The resin 10 is sprayed on to wall surfaces 9 using known epoxy "spinning" technology where a coating device is contained in the last sphere 16 that is passed through the section of the pipeline 6 to be coated. Details of such an applicator need not be discussed in detail herein as such apparatuses are well known in the art.

Based on the data collected about the condition of the pipeline, it can be determined whether further remediation of the pipeline beyond the application of a coating is needed. In such a case an engineer can review the data and determine if further reinforcing is needed in the form of a liner application.

In an alternate arrangement, the system of the present invention is towed into the pipeline and drawn back therethrough. As the system is initially towed into the pipeline, one module in the system evaluates the surface condition of the interior of the pipe and another module evaluates the structural condition of the wall of the pipe. Once the system is towed through the pipeline it is then drawn back through the pipeline and based on the evaluation data obtained from the two modules an epoxy material is applied to the interior surface of the pipe using a spin cast machine that is drawn behind the two modules. Preferably, a layer of epoxy is applied to the interior surface of the host pipe to the appropriate thickness using a machine such as a spincast machine that coats the walls of the pipe as it travels there along. Optionally, before drawing the system back through the pipeline a liner is attached to the system so that it can also tow the liner into the pipeline as it is drawn back.

Many different types of curable resins can be used for coating the inside walls 9 of the pipeline 6 and the inner layer of the liner if needed. Preferably the quick setting resin is or a moisture curing type and contains a light colored pigment agent. The thermosetting resin should have good adhesive strength and have high strength (for example, high flex modulus, flex strength, tensile modulus, and tensile strength properties.) Slow-curing resins may be used. For example, polyesters; vinyl esters such as urethane-based vinyl esters, and bisphenol A-fumarate based vinyl esters; and epoxy resins can be used. Epoxy resins are particularly preferred. For example, the assignee of the present invention employs an epoxy product under the product number S301 for resin 10 and an epoxy product under the product number T301 for resin 17. The quick setting resin 10 is applied to the inside pipeline walls 9 and the thermosetting resin 17 to the felt inner layer 16 of the lining hose 12 in an uncured, liquid form.

It can therefore be seen that the present invention provides a method and system for evaluating the interior surface and exterior wall conditions of a pipeline while also dynamically installing a repair coating in a pipeline, such as an underground water pipeline. The system further provides a smart coating application such as a layer of epoxy that is applied to the interior surface of the host pipe to the appropriate thickness based on the pipe condition as determined by the two modules. For these reasons, the instant invention is believed to represent a significant advancement in the art, which has substantial commercial merit.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed:
1. An apparatus for inspecting and coating interior surface walls of a pipe system comprising:
   a plurality of housings;
   an umbilical tether for towing said housings through said pipe system and connecting said housings to one another, said umbilical tether including a feed line for supplying a coating material;

scanning equipment for evaluating a condition of interior surface walls and a structural condition of said pipe system contained in a first of said housings; and a coating device contained in a second of said housings to apply a thickness of said coating material from said feed line to said interior surface of said pipe system automatically and dynamically in response to the evaluations performed by said scanning equipment.

2. The apparatus of claim 1, wherein said housings are spherical.

3. The apparatus of claim 1, wherein said scanning equipment is selected from the group consisting of: cameras, laser scanners and sonar.

4. The apparatus of claim 1, further comprising:

a control computer connected to said umbilical tether, said control computer receiving and recording data about the condition of said pipeline from said scanning equipment.

5. The apparatus of claim 4 wherein said control computer controls a rate of application of said coating device based on the condition of said pipeline.

6. The apparatus of claim 1, wherein said coating device is a spinning spray head.

7. The apparatus of claim 1, wherein said umbilical tether is used for towing said apparatus, transmitting data between a control computer and said apparatus and supplying coating material to said coating device.

8. The apparatus of claim 1, wherein said housings are in spaced apart relation and connected via said umbilical tether allowing said apparatus to be flexible.

9. A method of lining the interior surface walls of a pipe system comprising:

towing a pipe coating system using an umbilical tether including a feed line for supplying a coating material said pipe coating system including scanning equipment and a coating device through a pipeline to be repaired;

evaluating a condition of interior surface walls and a structural condition of the wall of said pipe system using said scanning equipment; and applying a thickness of said coating material from said feed line to said interior surface of said pipe system automatically and dynamically in response to the evaluations performed by said scanning equipment.

10. The method of claim 9, said coating system further comprising:

a plurality of housings, said scanning equipment in a first housing, said coating device in a second housing, and an umbilical tether for towing said housings through said pipe system and connecting said housings to one another.

11. The method of claim 9, further comprising:

towing a pipe liner sleeve into said pipeline behind said pipe coating system.

12. The method of claim 9, wherein said scanning equipment is selected from the group consisting of: cameras, laser scanners and sonar.

13. The method of claim 9, further comprising:

a control computer connected to said umbilical tether, said control computer receiving and recording data about the condition of said pipeline from said scanning equipment.

14. The method of claim 13 wherein said control computer controls a rate of application of said coating device based on the condition of said pipeline.

* * * * *